(12) United States Patent
Choi (10) Patent No.: US 11,841,538 B2
(45) Date of Patent: Dec. 12, 2023

(54) OPTICAL CONNECTOR HOLDER AND OPTICAL CONNECTOR ASSEMBLY INCLUDING SAME

(71) Applicant: A.J. WORLD CO., LTD., Seoul (KR)

(72) Inventor: Sun Ho Choi, Seoul (KR)

(73) Assignee: A.J. WORLD CO., LTD., Seoul (KR)

( * ) Notice: Subject to any disclaimer, the term of this patent is extended or adjusted under 35 U.S.C. 154(b) by 0 days.

(21) Appl. No.: 17/387,298

(22) Filed: Jul. 28, 2021

(65) Prior Publication Data

US 2022/0283385 A1    Sep. 8, 2022

(30) Foreign Application Priority Data

Mar. 4, 2021    (KR) .................... 10-2021-0028860

(51) Int. Cl.
   *G02B 6/38*    (2006.01)

(52) U.S. Cl.
   CPC ......... *G02B 6/3869* (2013.01); *G02B 6/3887* (2013.01)

(58) Field of Classification Search
   CPC .... G02B 6/381; G02B 6/3831; G02B 6/3887; G02B 6/3871; G02B 6/3869
   See application file for complete search history.

(56) References Cited

U.S. PATENT DOCUMENTS 10,604,933 B1 *  3/2020  Gilner ................. E04C 5/20
2005/0255745 A1 * 11/2005 Walker ............... H01R 13/6658
                                                            439/541.5
2011/0123157 A1 *  5/2011  Belsan ................. G02B 6/4292
                                                            439/523
2018/0329155 A1 * 11/2018 Verheyden ........... G02B 6/4471
2019/0101702 A1 *  4/2019  Li ........................ G02B 6/381
2022/0115823 A1 *  4/2022  Dittus ................ H01R 13/6392

FOREIGN PATENT DOCUMENTS

| JP | 2004226666 A | * | 8/2004 |
| JP | 2011-221397 A | | 11/2011 |
| JP | 2020016744 A | * | 1/2020 |
| KR | 10-0248970 B1 | | 3/2000 |
| KR | 10-1114289 B1 | | 3/2012 |
| KR | 20-0485300 B1 | | 12/2017 |

OTHER PUBLICATIONS

Office Action of Corresponding KR patent application No. 10-2021-0028860 (dated Dec. 6, 2022).

* cited by examiner

*Primary Examiner* — Eric Wong
(74) *Attorney, Agent, or Firm* — Knobbe, Martens, Olson & Bear, LLP (57) ABSTRACT

This application relates to an optical connector holder and an optical connector assembly including the optical connector holder. In one aspect, the optical connector holder includes a holder body including a mounting hole for inserting an optical connector, and a support piece extending from the mounting hole toward a rear side of the holder body to support the optical connector. The optical connector holder may also include a front end locking protrusion protruding from the mounting hole toward the optical connector to catch at least a portion of the optical connector when the optical connector is inserted into the mounting hole. The optical connector holder may further include a rear end locking protrusion protruding upward from the support piece so that the optical connector is seated in the mounting hole while being caught by the front end locking protrusion.

14 Claims, 8 Drawing Sheets

FRONT ← → REAR

FRONT ← → REAR

OPTICAL CONNECTOR HOLDER AND OPTICAL CONNECTOR ASSEMBLY INCLUDING SAME

CROSS-REFERENCE TO RELATED APPLICATION

This application claims priority to Korean Patent Application No. 10-2021-0028860, filed on Mar. 4, 2021. The entire contents of the application on which the priority is based are incorporated herein by reference.

BACKGROUND

Technical Field

The present disclosure relates to an optical connector holder and an optical connector assembly including same.

Description of Related Technology

Recently, a fiber-to-the-home (FTTH) system is being deployed on houses, apartments, etc. to provide various information including broadcasts and communications via optical cables.

In the FTTH system, optical cables are connected all the way to subscriber equipment, and terminated with connectors and installed on a wall. In this case, the FTTH worker conventionally add a few extra meters to the actual length of the optical cables when running them into the home, in consideration of the connections between the optical cables. Then, the worker would cut the optical cables to a required length at the installation site, assemble optical connectors onto their ends, and connect them to a fiber optic termination box and optical adapters in the home.

SUMMARY

One aspect is an optical connector holder and an optical connector assembly which allow for efficiently managing and fixing a plurality of optical connectors.

Another aspect is an optical connector holder including: a holder body including a mounting hole for inserting an optical connector; a support piece extending from the mounting hole toward a rear side of the holder body to support the optical connector; a front end locking protrusion protruding from the mounting hole toward the optical connector to catch at least a portion of the optical connector when the optical connector is inserted into the mounting hole; and a rear end locking protrusion protruding upward from the support piece so that the optical connector is seated in the mounting hole while being caught by the front end locking protrusion.

The optical connector holder may further include: a guide piece obliquely extending from an upper portion of the holder body in an upper direction, wherein the guide piece includes a guide hole for inserting at least a portion of the optical connector with elastically pressed, the guide hole being continuously extending from an upper portion of the mounting hole.

The front end locking protrusion may include: a first locking protrusion provided at one side of the mounting hole to support one side edge of the optical connector; and a second locking protrusion provided at the other side of the mounting hole to support the other side edge of the optical connector, wherein the first locking protrusion and the second locking protrusion may be spaced apart from each other in a width direction of the mounting hole.

The rear end locking protrusion may include: a first inclined surface portion which is formed to be upwardly inclined on the support piece; and a second inclined surface portion which is connected with the first inclined surface portion in a curved manner and is downwardly inclined from the first inclined surface portion.

The rear end locking protrusion may be positioned between the first locking protrusion and the second locking protrusion when viewed in a front and rear direction of the holder body, and a width of the rear end locking protrusion may be smaller than a distance between the first locking protrusion and the second locking protrusion.

Another aspect is an optical connector assembly including: an optical connector; and an optical connector holder, wherein the optical connector holder includes: a holder body including a mounting hole for inserting the optical connector; a support piece extending from the mounting hole toward a rear side of the holder body to support the optical connector; a front end locking protrusion protruding from the mounting hole toward the optical connector to catch at least a portion of the optical connector when the optical connector is inserted into the mounting hole; and a rear end locking protrusion protruding upward from the support piece so that the optical connector is seated in the mounting hole while being caught by the front end locking protrusion.

The front end locking protrusion may include: a first locking protrusion provided at one side of the mounting hole to support one side edge of the optical connector; and a second locking protrusion provided at the other side of the mounting hole to support the other side edge of the optical connector, wherein the first locking protrusion and the second locking protrusion may be spaced apart from each other in a width direction of the mounting hole.

The rear end locking protrusion may include: a first inclined surface portion which is formed to be upwardly inclined on the support piece; and a second inclined surface portion which is connected with the first inclined surface portion in a curved manner and is downwardly inclined from the first inclined surface portion.

The optical connector holder may further include: a guide piece obliquely extending from an upper portion of the holder body in an upper direction, wherein the guide piece may include a guide hole corresponding to a shape into which a latch portion of the optical connector is elastically pressed when the optical connector is inserted into the mounting hole, the guide hole being continuously extending in an upper portion of the mounting hole.

The rear end locking protrusion may be positioned between the first locking protrusion and the second locking protrusion when viewed in a front and rear direction of the holder body, and a width of the rear end locking protrusion may be smaller than a distance between the first locking protrusion and the second locking protrusion.

The optical connector may include: a connector body including an accommodating space where an optical cable is inserted, wherein a latch portion is provided at a front end portion of the connector body to obliquely extend and an opening which downwardly opens is formed at a rear end portion of the connector body; a cable clamp whose front end portion is rotatably connected to the connector body to open and close the opening; and a boot rotatably coupled to the rear end portion of the connector body and a rear end portion of the cable clamp to fix the optical cable inserted in the connector body.

The connector body may include a connector thread to which the boot is rotatably coupled, and the cable clamp may include a clamp thread corresponding to the connector thread.

According to embodiments of the present disclosure, it is possible to reduce the time taken to install a plurality of optical connectors at a site and to efficiently connect a plurality of optical connectors to a fiber optic termination box or optical adapters.

DETAILED DESCRIPTION

LC, ST, FC and SC connectors are widely used as optical connectors for connecting optical cables. However, most optical connectors take considerable time for site installation, and connecting optical fibers at the site is not an easy process. Moreover, it is hard to connect and install multiple optical connectors to a fiber optic termination box or optical adapters in an efficient way.

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, 'accessed' to, 'supplied' to, 'transferred' to, or 'contacted' with another element, it should be understood that the element may be directly connected to, supported by, accessed to, supplied to, transferred to, or contacted with another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as the upper side and the lower side, are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Hereinafter, a concrete construction of an optical connector assembly according to an embodiment of the present disclosure will be described with reference to FIGS. 1 to 8.

Figure 1:
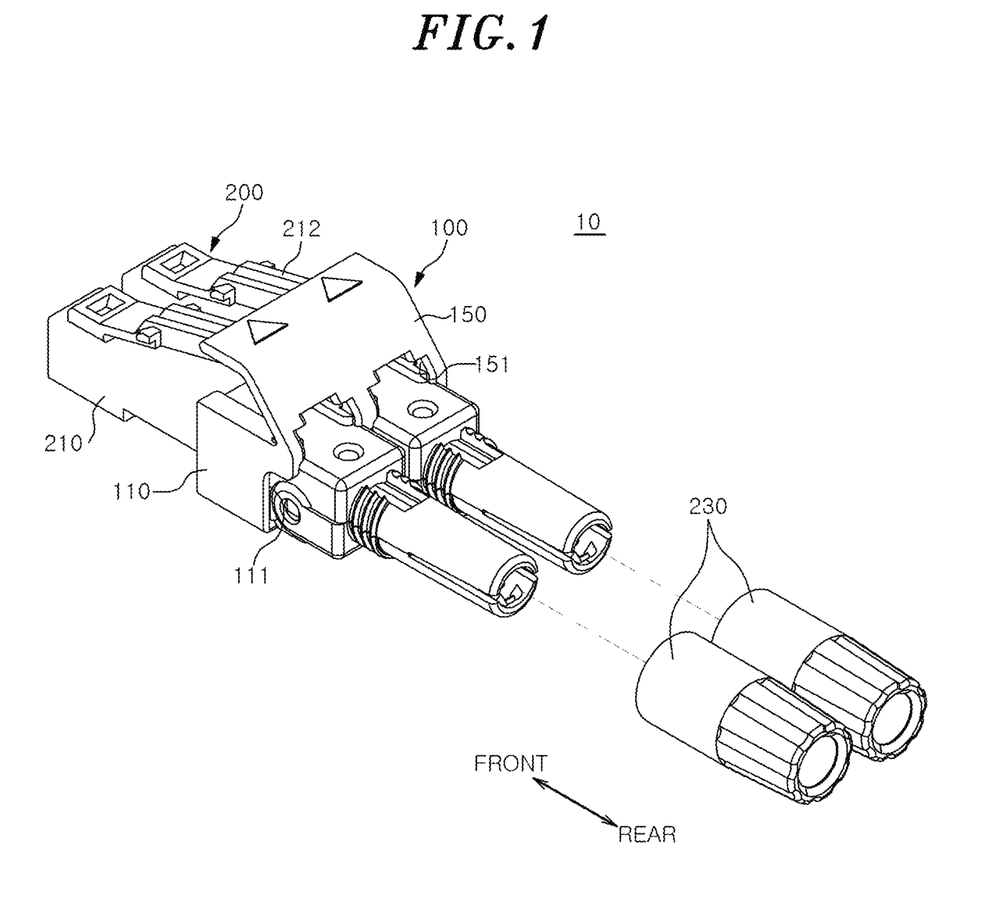
FIG. 1 is perspective view of an optical connector assembly according to an embodiment of the present disclosure.
Figure 2:
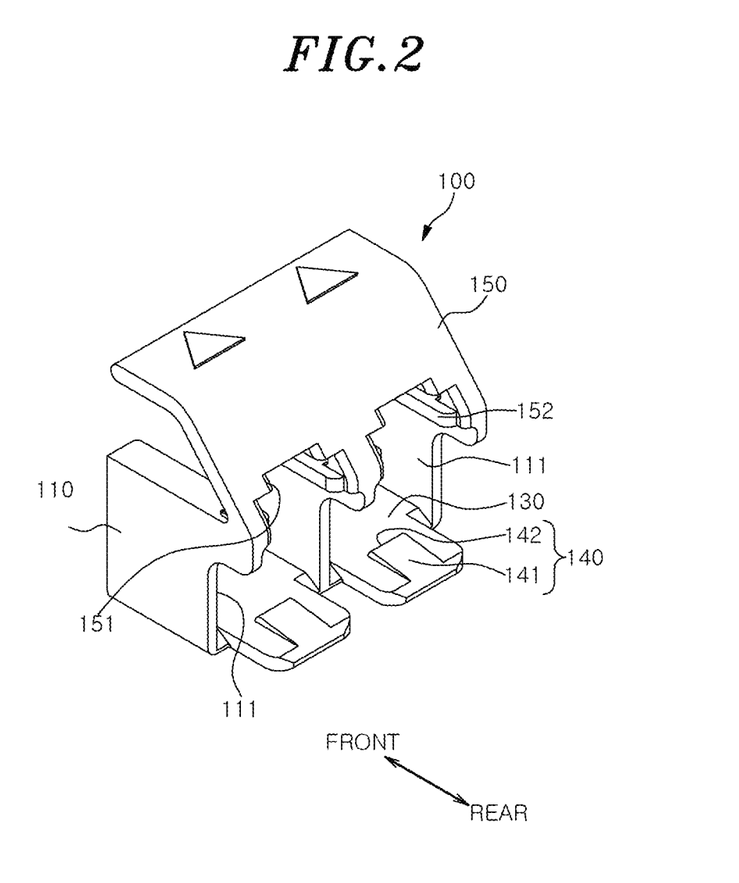
FIG. 2 is a perspective view of an optical connector holder according to the embodiment of the present disclosure as viewed from the front.
Figure 3:
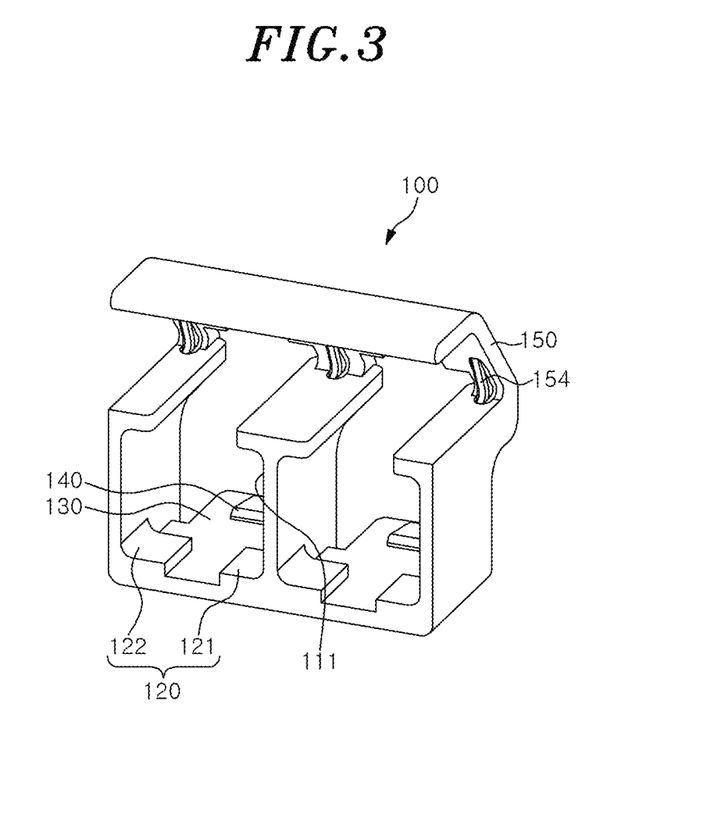
FIG. 3 is a perspective view of the optical connector holder according to the embodiment of the present disclosure as viewed from the rear.
Figure 4:
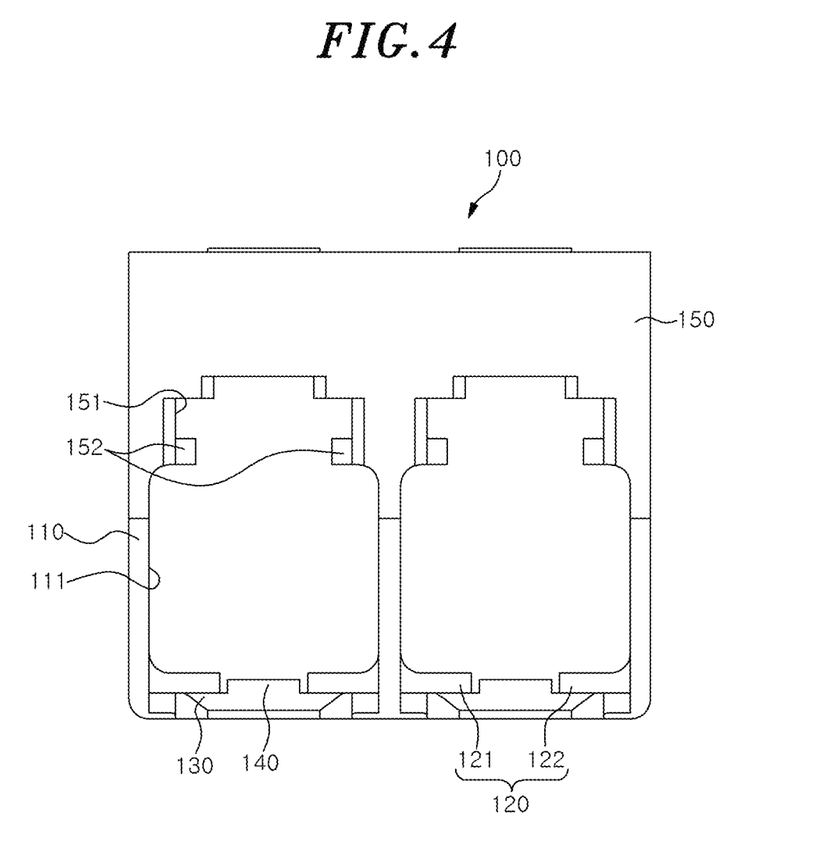
FIG. 4 is a rear view illustrating a rear end portion of the optical connector holder according to the embodiment of the present disclosure.
Figure 5:
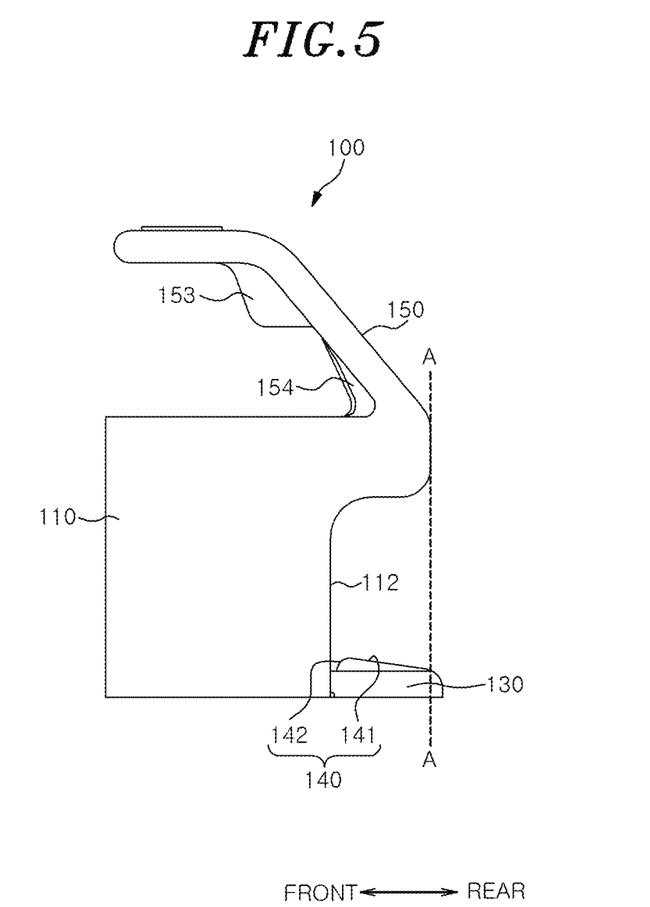
FIG. 5 is a side view illustrating a side of an optical connector holder according to the embodiment of the present disclosure.

FIG. 1 is perspective view of an optical connector assembly according to an embodiment of the present disclosure. FIG. 2 is a perspective view of an optical connector holder according to the embodiment of the present disclosure as viewed from the rear. FIG. 3 is a perspective view of the optical connector holder according to the embodiment of the present disclosure as viewed from the front. FIG. 4 is a rear view illustrating a rear end portion of the optical connector holder according to the embodiment of the present disclosure. FIG. 5 is a side view illustrating a side of the optical connector holder according to the embodiment of the present disclosure.

Referring to FIGS. 1 to 5, an optical connector assembly 10 according to the embodiment of the present disclosure may include a plurality of optical connectors 200 to which optical cables can be connected and an optical connector holder 100 to which the plurality of optical connectors 200 are mounted. In this embodiment, two optical connectors 200 may be inserted into the optical connector holder 100 and mounted therein.

The optical connector holder 100 may include a holder body 110, a front end locking protrusion 120, a support piece 130, a rear end locking protrusion 140, and a guide piece 150. The holder body 110 may be provided in the form of a bracket where the plurality of optical connectors 200 can be inserted and mounted. The holder body 110 may be formed with a mounting hole 111 in which an optical connector 200 can be inserted. The mounting hole 111 may be in the shape of a hole corresponding to an insert end of the optical connector 200. The holder body 110 may be formed with two mounting holes 111 side by side in a width direction.

While two mounting holes 111 are formed in the holder body 110 to mount two optical connectors 200 in the holder body 110 in the embodiment, three or more mounting holes may be formed in the holder body 110 in order to mount more optical connectors 200.

The front end locking protrusion 120 may be formed in the mounting hole 111 of the holder body 110. The front end locking protrusion 120 may be in the shape of a protrusion that protrudes inward from the mounting hole 111, more specifically, protrudes in a direction in which the optical connector 200 is positioned. As the front end locking protrusion 120 protrudes toward the optical connector 200, at least a portion of the optical connector 200, for example, a stepped portion 215 of the optical connector 200, may be caught on the front end locking protrusion 120.

A recessed groove 112, which is recessed toward the front, may be formed at a rear end portion of the holder body 110. As shown in FIG. 5, the recessed groove 112 may be positioned further forward than the front end of a second inclined surface portion 142 of the rear end locking protrusion 140, when viewed from the side of the optical connector holder 100.

For a single mounting hole 111, the front end locking protrusion 120 may include a first locking protrusion 121 formed on one side of the bottom of the mounting hole 111 and a second locking protrusion 122 formed on the other side of the bottom of the mounting hole 111. Since the first locking protrusion 121 is in the shape of a rectangle protruding from one side of the bottom of the mounting hole 111, an upper surface of the first locking protrusion 121 may support a bottom surface of one side edge of the optical connector 200 and a rear end portion of the first locking protrusion 121 may support the front end of the stepped portion 215 formed on the one side edge of the optical connector 200.

Since the second locking protrusion 122 is in the shape of a rectangle protruding on the other side of the bottom of the mounting hole 111, an upper surface of the second locking protrusion 122 may support a bottom surface of the other side edge of the optical connector 200 and a rear end portion of the second locking protrusion 122 may support the front end of the stepped portion 215 formed on the other side edge of the optical connector 200.

The first locking protrusion 121 and the second locking protrusion 122 may be spaced apart from each other by a given distance in a width direction of the mounting hole 111. The distance between the first locking protrusion 121 and the second locking protrusion 122 may correspond to a width of the first locking protrusion 121 or a width of the second locking protrusion 122.

Moreover, as shown in FIG. 3, a length in which the first locking protrusion 121 and the second locking protrusion 122 extend in a front and rear direction may be shorter than a length in which the holder body 110 extends in the front and rear direction. The first locking protrusion 121 and the second locking protrusion 122 may support a portion of the bottom surface of the optical connector 200.

The support piece 130 may extend further rearward than the holder body 110 from the mounting hole 111 of the holder body 110. As shown in FIG. 5, the rear end of the support piece 130 may protrude further than the rear end portion of the holder body 110. In other words, the rear end of the support piece 130 may protrude further rearward than an imaginary line A-A extending in an up and down direction from the rear end portion of the holder body 110. In addition, when the optical connector 200 is inserted into the mounting hole 111 of the holder body 110, the support piece 130 may support the bottom surface of the optical connector 200. The rear end locking protrusion 140 may be formed on the upper surface of the support piece 130.

The rear end locking protrusion 140 may protrude upward from the upper surface of the support piece 130. There is a height difference between the rear end locking protrusion 140 and the upper surface of the support piece 130. When the optical connector 200 is inserted into the mounting hole 111 of the holder body 110, the rear end of the stepped portion 215 of the optical connector 200 is supported on the rear end locking protrusion 140 while the front end of the stepped portion 215 of the optical connector 200 catches on the front end locking protrusion 120. Thus, the stepped portion 215 of the optical connector 200 may be seated in a space between the front end locking protrusion 120 and the rear end locking protrusion 140.

The rear end locking protrusion 140 may include a first inclined surface portion 141 and a second inclined surface portion 142. The first inclined surface portion 141 may be formed on the support piece 130 to be upwardly inclined toward the front of the holder body 110. The second inclined surface portion 142 may be connected with the front end of the first inclined surface portion 141 in a curved manner. The second inclined surface portion 142 may be curved downward at a connection portion with the first inclined surface portion 141. In this instance, an inclination angle between the first inclined surface portion 141 and the upper surface of the support piece 130 may be a more gentle inclination angle than an inclination angle between the second inclined surface portion 142 and the upper surface of the support piece 130.

The rear end locking protrusion 140 may be positioned at the center of the upper surface of the support piece 130. More specifically, the rear end locking protrusion 140 may be positioned in a line extending in a gap between the first locking protrusion 121 and the second locking protrusion 122 in the front and rear direction of the holder body 110. The width of the rear end locking protrusion 140 may be smaller than the distance between the first locking protrusion 121 and the second locking protrusion 122. When the stepped portion 215 of the optical connector 200 is seated between the space between the front end locking protrusion 120 and the rear end locking protrusion 140, both side edges of the front end of the stepped portion 215 may be supported on the first locking protrusion 121 and the second locking protrusion 122, and a rear center portion of the stepped portion 215 may be supported on the rear end locking protrusion 140. Accordingly, the optical connector 200 may be seated stably on the holder body 110.

The guide piece 150 may extend from an upper portion of the holder body 110 to be upwardly inclined in the front direction of the holder body 110. The guide piece 150 may be formed with a supporting rib 153 for supporting a latch portion 212 of the optical connector 200 and a reinforcement rib 154 for reinforcing a portion where the guide piece 150 and the upper portion of the holder body 110 are connected.

Moreover, the guide piece 150 may be formed with a guide hole 151. The guide hole 151 may be formed in the shape of a hole leading from an upper portion of the mounting hole 111. When the optical connector 200 is inserted into the holder body 110, at least a portion of the optical connector 200, for example, the latch portion 212 of the optical connector 200, may be elastically pressed against and inserted into the guide hole 151. To this end, the guide hole 151 may have a shape corresponding to a shape into which the latch portion 212 is elastically pressed.

In addition, a guide ridge 152 may be formed at a portion where the guide hole 151 and the mounting hole 111 are connected. When the optical connector 200 is inserted into the mounting hole 111 of the holder body 110, the guide ridge 152 may support an upper surface of the optical connector 200. The guide ridge 152 may include a pair of guide ridges 152 which protrude inward so as to face each other at the portion where the guide hole 151 and the mounting hole 111 are connected.

Figure 6:
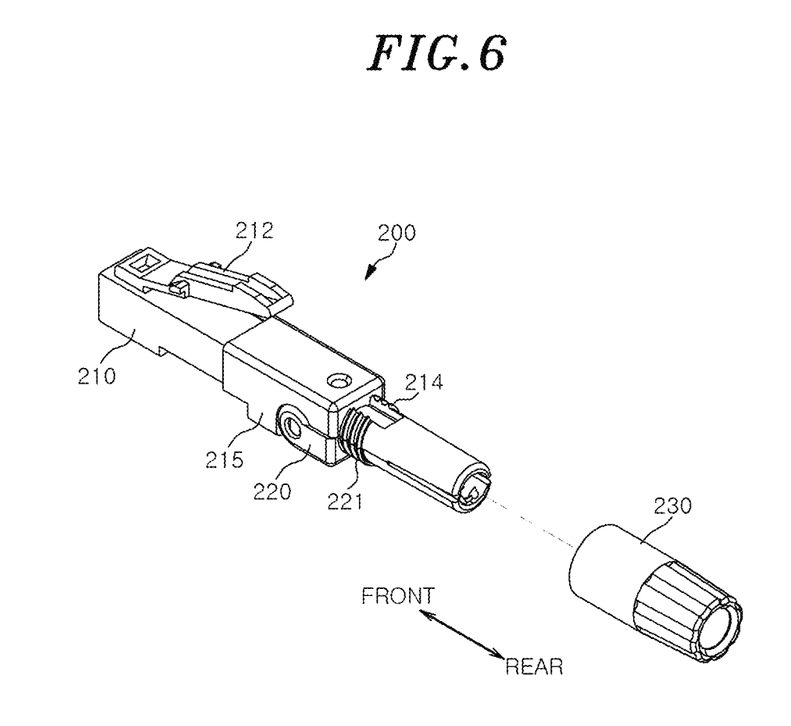
FIG. 6 is a perspective view of an optical connector according to the embodiment of the present disclosure.
Figure 7:
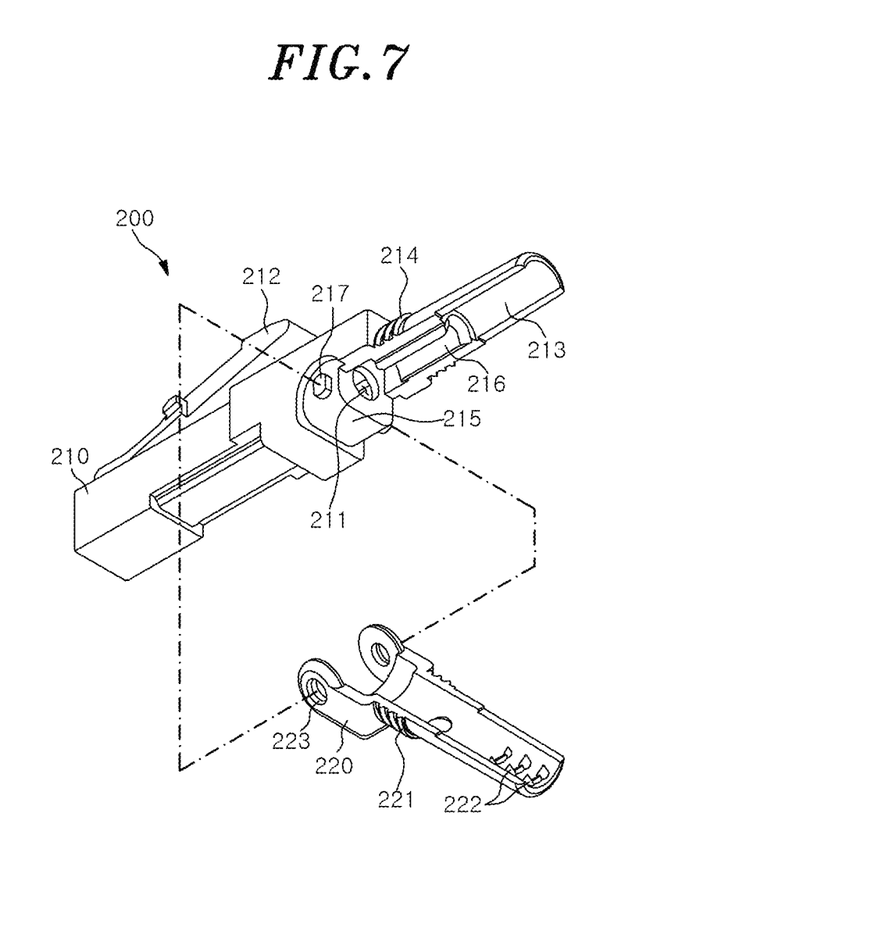
FIG. 7 is an exploded perspective view of the optical connector according to the embodiment of the present disclosure.
Figure 8:
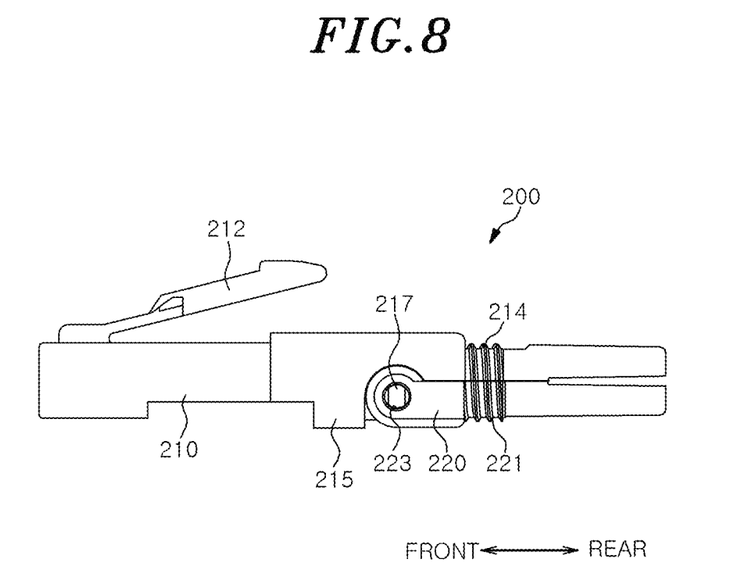
FIG. 8 is an exploded side view of the optical connector according to the embodiment of the present disclosure.

FIG. 6 is a perspective view of the optical connector according to the embodiment of the present disclosure. FIG. 7 is an exploded perspective view of the optical connector according to the embodiment of the present disclosure. FIG. 8 is an exploded side view of an optical connector according to the embodiment of the present disclosure.

Referring to FIGS. 6 to 8, the optical connector 200 may include a connector body 210, a cable clamp 220, and a boot 230.

The connector body 210 may provide an accommodating space 211 where an optical cable is inserted. The end of the optical cable may be inserted into the accommodating space 211. Also, the accommodating space 211 may be provided with an optical connecting member. Since the optical connecting member is a typical component for connecting an optical fiber in a ferrule and an optical fiber in the optical cable, a detailed description of the optical connecting member will be omitted.

The stepped portion 215 may be formed in a lower portion of the connector body 210. The stepped portion 215 may be protruded downwardly from a lower center portion of the connector body 210. When the optical connector 200 is inserted into the mounting hole 111 of the optical connector holder 100, the stepped portion 215 may be seated in the space between the front end locking protrusion 120 and the rear end locking protrusion 140 of the optical connector holder 100.

The latch portion 212 may extend obliquely in the rear direction at a front end portion of the connector body 210. The latch portion 212 may function as a clamp for assembling with a connector connection device (e.g., an adapter). The latch portion 212 may be provided in the shape of a hook for coupling with the connection device.

A cross section of a rear end portion of the connector body 210 may be a semi-circular shape. An opening 213 that downwardly opens may be formed at the rear end portion of the connector body 210. The opening 213 may be opened and closed by a cable clamp 220. When the opening 213 is opened by the cable clamp 220, the end of the optical cable may be inserted into the accommodating space 211 of the connector body 210. When the opening 213 is closed by the cable clamp 220, the optical cable may be pressed against the cable clamp 220 and fixed to the connector body 210.

A connector thread 214 to which the boot 230 is rotatably coupled may be formed at the rear end portion of the connector body 210. When the opening 213 is closed by the cable clamp 220, the connector thread 214 may take the form of a helix which extends continuously to connect to a clamp thread 221 of the cable clamp 220. The boot 230 may be rotatably coupled to the connector thread 214 and the clamp thread 221.

A pressing bump 216 may be formed at the rear end portion of the connector body 210. With the optical cable inserted in the opening 213, when the opening 213 is closed by the cable clamp 220, the pressing bump 216 may apply pressure to an outer surface of the optical cable, thereby steadily fixing the optic table in place.

The cable clamp 220 may be provided in a lower side of the rear end portion of the connector body 210. A cross section of the cable clamp 220 may have a semi-circular shape. When the cable clamp 220 is assembled to the rear end portion of the connector body 210, the cross section of the cable clamp 220 and the rear end portion of the connector body 210 may be a substantially circular shape.

A hinge hole 223 may be formed at a front end portion of the cable clamp 220. As a hinge protrusion 217 of the connector body 210 is inserted into the hinge hole 223, the cable clamp 220 may be rotatably connected to the connector body 210. As such, the cable clamp 220 may open and close the opening 213 of the connector body 210.

A pressing protrusion 222 may be formed at the rear end portion of the connector body 210. When the opening 213 is closed by the cable clamp 220, the pressing protrusion 222 may apply pressure to the outer surface of the optical cable, thereby stably fixing the optical cable in place. Particularly, when the opening 213 is closed by the cable clamp 220, the pressing protrusion 222 applies pressure to the outer surface of one side at the rear of the optical cable within the opening 213 and the pressing bump 216 of the connector body 210 applies pressure to the outer surface of the other side at the front of the optical cable within the opening 213, thereby securely fixing the optical cable by means of the pressing protrusion 222 and the pressing bump 216.

When penetrated through the rear end portion of the connector body 210 and a rear end portion of the cable clamp 220, the boot 230 may be rotatably coupled to the rear end portion of the connector body 210 and the cable clamp 220, thereby fixing the optical cable in place while rigidly fastening the connector body 210 and the cable clamp 220 together. A boot thread may be formed on an inner diameter surface of the boot 230. The boot thread of the boot 230 may be rotatably coupled to the connector thread 214 of the connector body 210 and the clamp thread 221 of the cable clamp 220.

The operation and effects of the optical connector assembly with the above-described construction will be described below.

First of all, once the optical cable is inserted to penetrate through the boot 230, the jacket of the optical cable is removed so that a portion of the optical fiber remains at the end of the optical cable. After the jacket is removed, the optical fiber is cut to a certain length by using a length jig and a cleaver, and the end of the optical cable is assembled to the optical connector 200.

In order to assemble the end of the optical cable to the optical connector 200, the cable clamp 220 is rotated first to open the opening 213 of the connector body 210. Once the opening 213 of the connector body 210 is opened, the end of the optical cable is inserted into the accommodating space 211 of the connector body 210. Then, the cable clamp 220 is rotated to close the opening 213 of the connector body 210. At this point, the optical cable within the opening 213 may be pressed against the pressing protrusion 222 of the cable clamp 220 and the pressing bump 216 of the connector body 210.

Once the opening 213 of the connector body 210 is closed by rotating the cable clamp 220, the boot 230 is penetrated through the rear end portion of the connector body 210 and the rear end portion of the cable clamp 220. After that, the boot 230 is rotatably coupled to the connector body 210 and the cable clamp 220, thereby completing the assembling of the optical cable to the optical connector 200. A plurality of optical connectors 200 into which optical cables are inserted can be assembled in the same manner.

Meanwhile, after completion of the assembling of two optical connectors 200 where the optical cables are connected, these two optical connectors 200 are mounted to the optical connector holder 100.

For example, two optical connectors 200 are inserted into the mounting holes 111 of the optical connector holder 100 and then moved toward the front of the optical connector holder 100. At this point, the latch portion 212 of the optical connector 200 may be elastically pressed against and inserted into the guide hole 151 of the optical connector holder 100.

When the optical connector 200 is moved further toward the front of the optical connector holder 100, the stepped portion 215 of the optical connector 200 catches on the front end locking protrusion 120 of the optical connector holder 100. At this point, the stepped portion 215 of the optical connector 200 rides over the rear end locking protrusion 140, and accordingly the stepped portion 215 of the optical connector 200 is seated in the space between the front end locking protrusion 120 of the optical connector holder 100 and the rear end locking protrusion 140. As a result, the optical connector 200 may be stably mounted onto the optical connector holder 100.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. An optical connector holder comprising:
a holder body including a mounting hole for inserting an optical connector;
a support piece extending from the mounting hole toward a rear side of the holder body to support the optical connector;
a front end locking protrusion protruding from the mounting hole toward the optical connector to catch at least a portion of the optical connector when the optical connector is inserted into the mounting hole;
a rear end locking protrusion protruding upward from the support piece so that the optical connector is seated in the mounting hole while being caught by the front end locking protrusion; and
a guide piece obliquely extending from an upper portion of the holder body in an upper direction,
wherein the guide piece includes a guide hole configured to elastically press and receive at least a portion of the optical connector, the guide hole continuously extending from an upper portion of the mounting hole,
wherein a rearmost end of the support piece protrudes rearward beyond a rearmost end of the holder body, and
wherein the guide piece includes a base end connected to a rear portion of the holder body and a free end disposed at a front side of the holder body.

2. The optical connector holder of claim 1, wherein the front end locking protrusion comprises:
a first locking protrusion provided at one side of the mounting hole to support one side edge of the optical connector; and
a second locking protrusion provided at the other side of the mounting hole to support the other side edge of the optical connector,
wherein the first locking protrusion and the second locking protrusion are spaced apart from each other in a width direction of the mounting hole.

3. The optical connector holder of claim 1, wherein the rear end locking protrusion comprises:
a first inclined surface portion formed to be upwardly inclined on the support piece; and
a second inclined surface portion connected to the first inclined surface portion in a curved manner and is downwardly inclined from the first inclined surface portion.

4. The optical connector holder of claim 2, wherein the rear end locking protrusion is positioned between the first locking protrusion and the second locking protrusion when viewed in a front and rear direction of the holder body, and
wherein a width of the rear end locking protrusion is smaller than a distance between the first locking protrusion and the second locking protrusion.

5. An optical connector assembly comprising:
an optical connector; and
an optical connector holder,
wherein the optical connector holder includes:
a holder body including a mounting hole for inserting the optical connector;
a support piece extending from the mounting hole toward a rear side of the holder body to support the optical connector;
a front end locking protrusion protruding from the mounting hole toward the optical connector to catch at least a portion of the optical connector when the optical connector is inserted into the mounting hole;
a rear end locking protrusion protruding upward from the support piece so that the optical connector is seated in the mounting hole while being caught by the front end locking protrusion; and
a guide piece obliquely extending from an upper portion of the holder body in an upper direction,
wherein the guide piece includes a guide hole configured to elastically press and receive at least a portion of the optical connector, the guide hole continuously extending from an upper portion of the mounting hole,
wherein a rearmost end of the support piece protrudes rearward beyond a rearmost end of the holder body, and
wherein the guide piece includes a base end connected to a rear portion of the holder body and a free end disposed at a front side of the holder body.

6. The optical connector assembly of claim 5, wherein the front end locking protrusion comprises:
a first locking protrusion provided at one side of the mounting hole to support one side edge of the optical connector; and
a second locking protrusion provided at the other side of the mounting hole to support the other side edge of the optical connector,
wherein the first locking protrusion and the second locking protrusion are spaced apart from each other in a width direction of the mounting hole.

7. The optical connector assembly of claim 5, wherein the rear end locking protrusion comprises:
a first inclined surface portion formed to be upwardly inclined on the support piece; and
a second inclined surface portion connected to the first inclined surface portion in a curved manner and is downwardly inclined from the first inclined surface portion.

8. The optical connector assembly of claim 6, wherein the rear end locking protrusion is positioned between the first locking protrusion and the second locking protrusion when viewed in a front and rear direction of the holder body, and
wherein a width of the rear end locking protrusion is smaller than a distance between the first locking protrusion and the second locking protrusion.

9. The optical connector assembly of claim 5, wherein the optical connector comprises:
a connector body including an accommodating space where an optical cable is inserted, wherein a latch portion is provided at a front end portion of the connector body to obliquely extend and an opening which downwardly opens is formed at a rear end portion of the connector body;

a cable clamp whose front end portion is rotatably connected to the connector body to open and close the opening; and a boot rotatably coupled to the rear end portion of the connector body and a rear end portion of the cable clamp to fix the optical cable inserted in the connector body.

10. The optical connector assembly of claim 9, wherein the connector body includes a connector thread to which the boot is rotatably coupled, and wherein the cable clamp includes a clamp thread corresponding to the connector thread.

11. The optical connector holder of claim 1, wherein the rearmost end of the support piece protrudes further rearward than an imaginary line extending in an up and down direction from the rearmost end of the holder body.

12. The optical connector holder of claim 1, wherein the rearmost end of the support piece is configured to contact and support a bottom surface of the optical connector when the optical connector is inserted into the mounting hole of the holder body.

13. The optical connector holder of claim 1, wherein the rearmost end of the support piece outwardly extends beyond an imaginary line vertically extending from the rearmost end of the holder body to the support piece.

14. The optical connector holder of claim 13, wherein the rearmost end of the support piece is not flush with the imaginary line.

* * * * *